United States Patent
Brown (10) Patent No.: US 11,037,217 B2
(45) Date of Patent: Jun. 15, 2021

(54) SYSTEM, METHOD, AND APPARATUS FOR DISPLAYING PROPRIETARY INFORMATION WITHIN A QUICK RESPONSE (QR) CODE

(71) Applicant: Michael R. Brown, Chesire (GB)

(72) Inventor: Michael R. Brown, Chesire (GB)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 14/801,974

(22) Filed: Jul. 17, 2015

(65) Prior Publication Data

US 2016/0253732 A1    Sep. 1, 2016

Related U.S. Application Data

(60) Provisional application No. 62/027,006, filed on Jul. 21, 2014.

(51) Int. Cl.
*G06Q 30/06* (2012.01)
*G06Q 10/00* (2012.01)
(Continued)

(52) U.S. Cl.
CPC ..... *G06Q 30/0623* (2013.01); *G06K 7/10722* (2013.01); *G06K 7/1417* (2013.01); *G06Q 10/00* (2013.01); *G06Q 30/00* (2013.01)

(58) Field of Classification Search
CPC .......... G06F 17/30879; G06F 11/0766; G06F 11/321; G06F 21/602; G06F 21/6218;
(Continued)

(56) References Cited

U.S. PATENT DOCUMENTS 4,435,777 A * 3/1984 McCaskill ............ G06F 17/243
715/205
8,511,562 B2    8/2013 Onoda et al.
(Continued)

FOREIGN PATENT DOCUMENTS

CN       101099161       1/2008
JP       A2005301656    10/2005
(Continued)

OTHER PUBLICATIONS

International Search Report and Written Opinion dated Sep. 24, 2015 for International Application No. PCT/US2015/040841 filed Jul. 17, 2015.
(Continued)

*Primary Examiner* — Thien M Le
*Assistant Examiner* — Tae W Kim (57) ABSTRACT

A system, method and apparatus for displaying proprietary information within a multi-layer quick response code may be disclosed. An individual may use a unique quick response code scanner within a mobile application on a mobile device to read a quick response code affixed to an item or product. Through the mobile application, the quick response code scanner may read information embedded within the quick response code unique to the mobile application. The individual may be linked to content hosted on or accessed via a web portal associated with the mobile application. The individual may then be presented with information accessed from a variety of data sources, including from sources other than the retailer of the item, or with proprietary information unique to the mobile application provider.

14 Claims, 7 Drawing Sheets

100

(51) Int. Cl.
*G06Q 30/00* (2012.01)
*G06K 7/10* (2006.01)
*G06K 7/14* (2006.01)

(58) Field of Classification Search
CPC ...... G06F 2221/2107; G06K 19/06037; G06K 19/00; G06K 19/06112; G06K 2019/06225; G06K 7/1095; G06K 7/14; G06K 7/1417; G06K 7/1456; G06K 9/18; G06K 9/20; G06Q 10/00; G06Q 20/3276; G06Q 20/389; G06Q 30/04; G07D 11/0066; G07D 7/0026; G07D 7/0093; G07F 7/08; G07F 7/0813; G07F 7/127; G07G 5/00; G09C 5/00; H04L 2209/56; H04L 67/02; H04L 67/10; H04L 67/36; H04L 9/28; H04N 1/32128
USPC .................................................. 235/462.11
See application file for complete search history.

(56) References Cited

U.S. PATENT DOCUMENTS

| | | | | |
|---|---|---|---|---|
| 8,746,548 | B2* | 6/2014 | Terwilliger | H04L 67/36 235/375 |
| 8,756,124 | B1* | 6/2014 | Sayers, III | G06F 19/327 235/375 |
| 2008/0215489 | A1* | 9/2008 | Lawson | G06Q 20/389 705/50 |
| 2011/0089229 | A1 | 4/2011 | Shenfield et al. | |
| 2012/0221724 | A1 | 8/2012 | Chor | |
| 2013/0041781 | A1* | 2/2013 | Freydberg | G06Q 50/01 705/27.1 |
| 2013/0092630 | A1 | 4/2013 | Wegener | |
| 2013/0197945 | A1 | 8/2013 | Anderson | |
| 2014/0175167 | A1 | 6/2014 | Argue et al. | |
| 2015/0332079 | A1* | 11/2015 | Park | G06K 9/18 235/462.09 |

FOREIGN PATENT DOCUMENTS

| | | |
|---|---|---|
| JP | 2009-026034 | 2/2009 |
| JP | 2010-026659 | 2/2010 |
| JP | 4761400 | 8/2011 |
| JP | A2014515630 | 7/2014 |
| KR | 10-2013-0090504 | 8/2013 |
| WO | 0210091 | 2/2002 |
| WO | 2002010091 | 2/2002 |
| WO | 2014/104852 | 8/2011 |

OTHER PUBLICATIONS

International Preliminary Report on Patentability dated Jan. 24, 2017 for International Application No. PCT/US2015/040841 filed Jul. 17, 2015.

Dunja Kandel: "Product guide Online Edition: RFID, NFC, Smart cards; Heading for success with the right product", RFID im Blick, Dec. 31, 2013 (Dec. 31, 2013), p. 45, https://www.rfid-im-blick.de/en/download.html?id=4_635e5b255d152a9901a1a123d48a344a.

* cited by examiner

SYSTEM, METHOD, AND APPARATUS FOR DISPLAYING PROPRIETARY INFORMATION WITHIN A QUICK RESPONSE (QR) CODE

CROSS-REFERENCE TO RELATED APPLICATION

The present application claims priority from U.S. Provisional Application No. 62/027,006, filed Jul. 21, 2014, which is incorporated by herein by reference in its entirety.

BACKGROUND OF THE INVENTION

Quick Response (QR) codes have become common in the consumer marketplace. QR codes are two-dimension bar codes that contain information about the product or item to which it is attached. Typically, a QR code scanner or device equipped with a scanner, such as a smart phone, can read the QR code and convert it to some useful form. For example, a QR code scanner may read a QR code affixed to an item and link to web content created by the retailer, thereby obviating the need for a user to type a web address into a web browser or otherwise search for desired content. This typically takes the form of consumer-oriented marketing information which may include details of a specific style or range of products, special offers, competitions and loyalty schemes.

However, the information provided by a QR code is limited to that information provided by the retailer. In many instances, it would be useful for consumers to scan a QR code and be provided with information from a range of sources containing a variety of data relevant to the product.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In one exemplary embodiment, a system, method and apparatus for displaying proprietary information within a multi-layer quick response code may be described. An individual may use a unique quick response code scanner within a mobile application on a mobile device to read a quick response code affixed to an item or product. Through the mobile application, the quick response code scanner may read information embedded within the quick response code unique to the mobile application. The individual may be linked to content hosted on or accessed via a web portal associated with the mobile application. The individual may then be presented with information accessed from a variety of data sources, including from sources other than the retailer of the item, or with proprietary information unique to the mobile application provider.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

Advantages of embodiments of the disclosure will be apparent from the following detailed description of the exemplary embodiments. The following detailed description should be considered in conjunction with the accompanying figures.

Exemplary

Exemplary

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions stored on a memory being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to at least one exemplary embodiment, a method, system, and apparatus for displaying proprietary information within a quick response code may be described.

Figure 1:
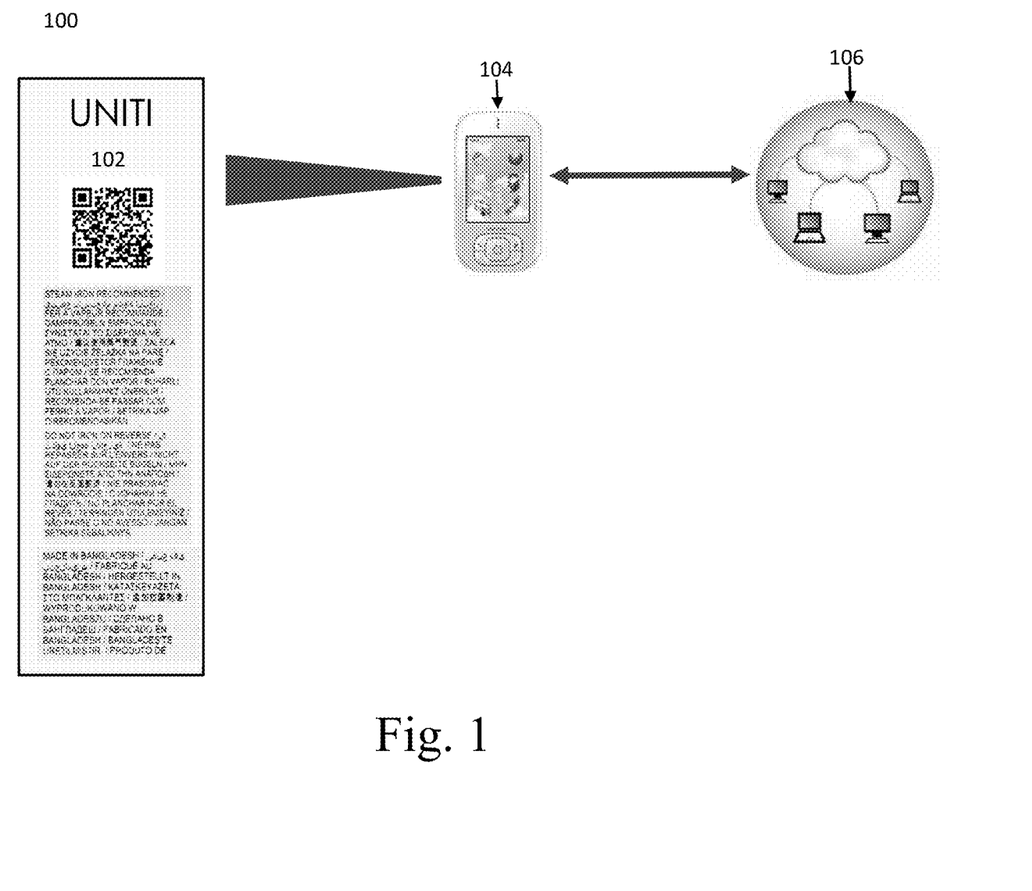
FIG. 1 is an exemplary embodiment of a multi-layered QR code.

FIG. 1 may show an exemplary embodiment 100 of a method, system, and apparatus for displaying proprietary information using a QR code. In this example, a multi-layered QR code 102 may be affixed to a particular item or product. A first layer of the QR code 102 may be decoded by a freely available generic application which may link to, and display, content provided by the retailer, for example, a retailer-assigned webpage. In addition, a smartphone, tablet or other mobile device 104 may be equipped with a camera or reader and may have a suitable proprietary mobile application which may be used to further decode additional layers of the QR code 102 affixed to the item and link the individual to a variety of additional sources 106, including additional proprietary information not accessible through the generic application. In one exemplary embodiment, the proprietary mobile application may assign a specific code to individual merchants or retailers for identification purposes.

Figure 2:
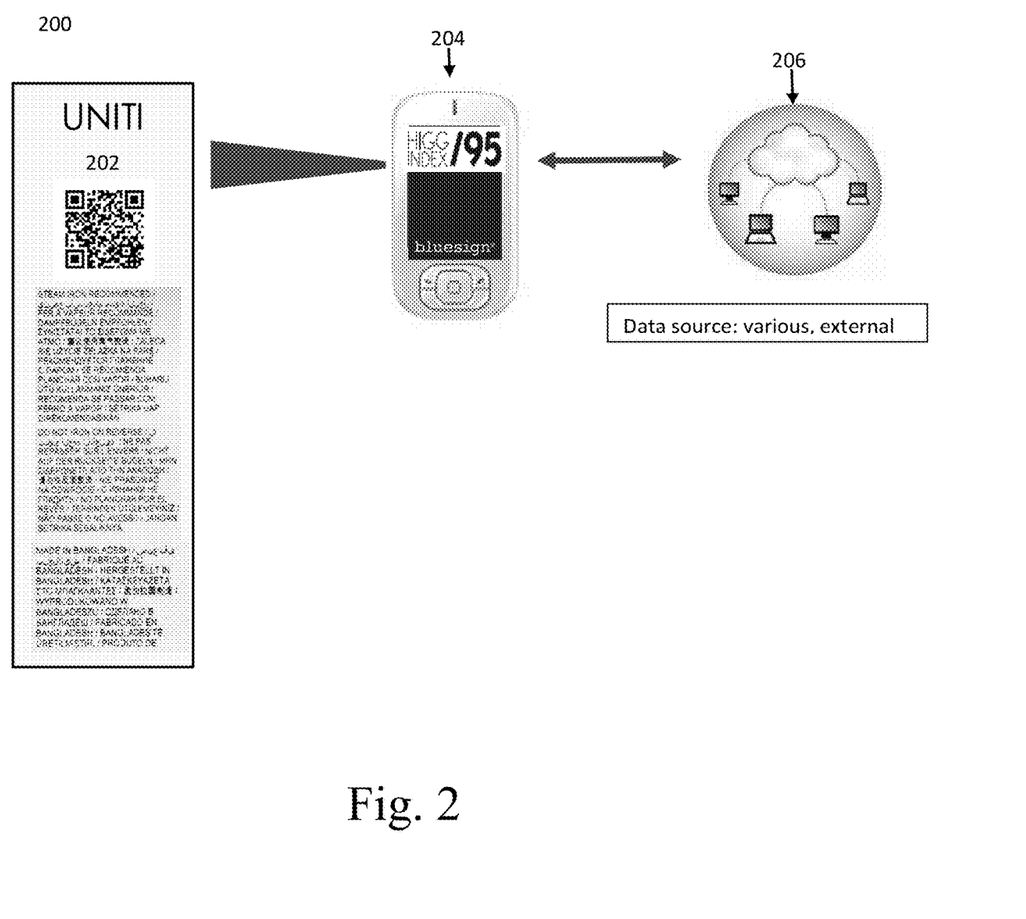
FIG. 2 is an exemplary embodiment for producing proprietary content from a QR code read in the form of sustainability data.

FIG. 2 may show an exemplary embodiment 200 of, for example, proprietary content read in the form of sustainability data that may be provided through a QR code 202 in connection with the proprietary mobile application described herein.

At a point of sale or post-purchase, a consumer may scan the QR code 202 using the proprietary mobile application to access sustainability data 204 relevant to the production process and/or distribution of the product or item. Data could include, for example, Higg Index, Bluesign, or other sustainability data as would be understood by a person of ordinary skill in the art. The data in this model could be hosted, for example, on a variety of external systems 206 and compiled by a portal associated with the mobile application into a 'dashboard' for presentation to the consumer.

Figure 3:
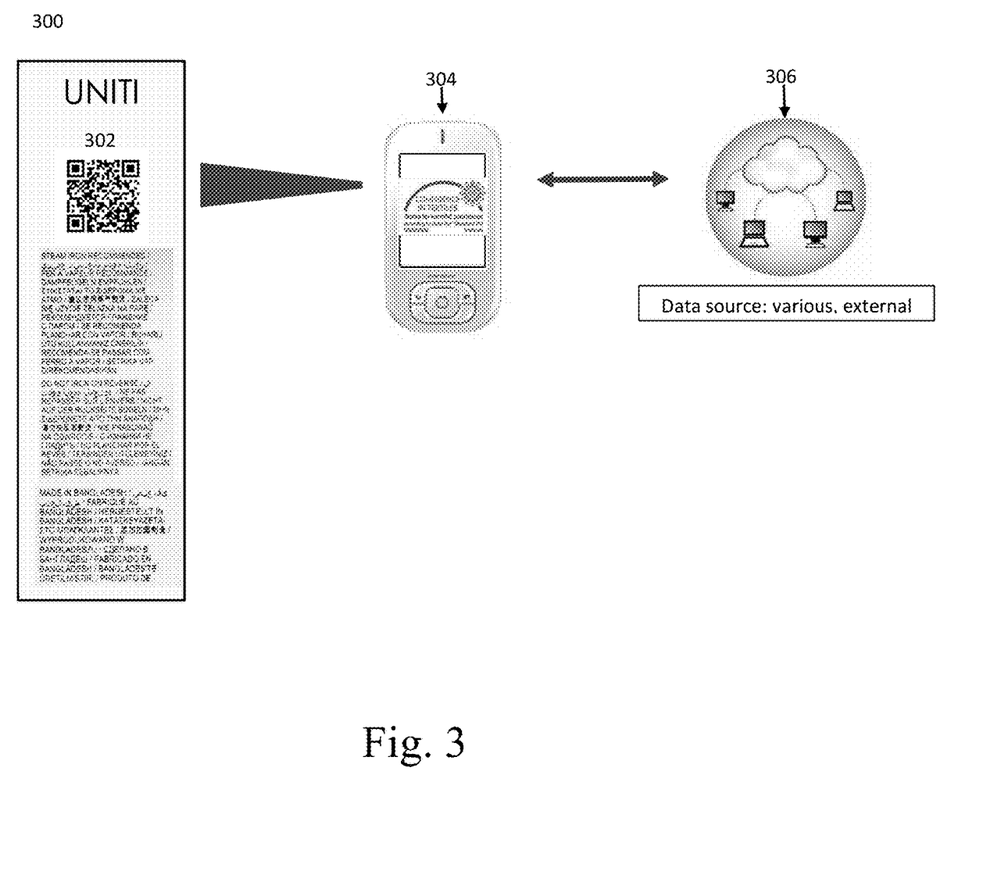
FIG. 3 is an exemplary embodiment for producing proprietary content from a QR code read in the form of RSL/toxicity data.

FIG. 3 may show another exemplary embodiment 300 of proprietary content read in the form of RSL/toxicity data that may be provided through a QR code 302 in connection with the proprietary mobile application described herein.

At a point of sale or post-purchase, a consumer may scan the QR code 302 using the proprietary mobile application to access product safety data 304 relevant to the material content of the specific item or product. Data could include, for example, RBO RSL, OekoTex, REACH, or other toxicity data as would be understood by a person of ordinary skill in the art. The data in this model could be hosted, for example, on a variety of external systems 306 and compiled by a portal associated with the mobile application into a 'dashboard' for presentation on a display to the consumer.

Figure 4:
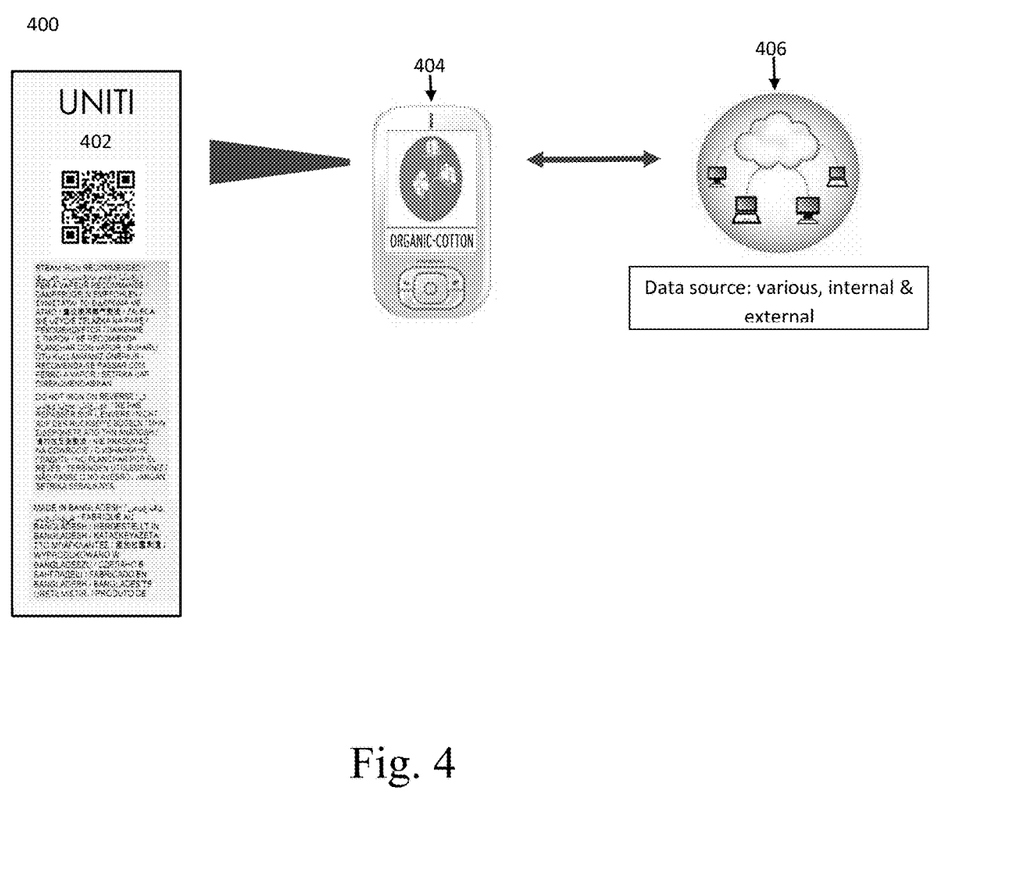
FIG. 4 is an exemplary embodiment for producing proprietary content from a QR code read in the form of provenance data.

FIG. 4 may show another exemplary embodiment 400 of, for example, proprietary content read in the form of provenance data that may be provided through a QR code 402 in connection with the proprietary mobile application described herein.

In this exemplary embodiment, at a point of sale or post-purchase, a consumer may scan a QR code 402 using the proprietary mobile application to access details of the item or products' supply chain 404 including, for example, origin of the raw material (e.g. organic cotton) and manufacturing site together with any available accreditations for social and ethical compliance as would be understood by a person of ordinary skill in the art. The data in this model could be hosted, for example, on a variety of external or internal systems 406, such as a remotely located server, and may be compiled by a portal associated with the mobile application into a 'dashboard' for presentation on a display to the consumer.

Figure 5:
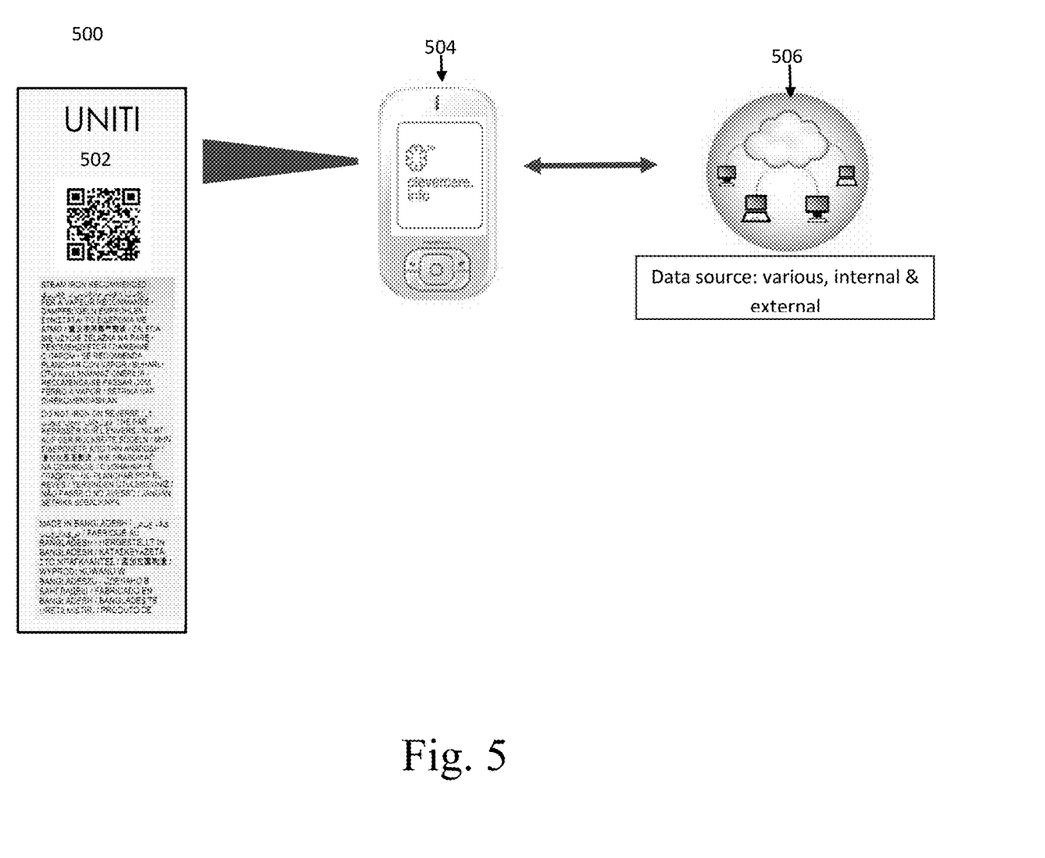
FIG. 5 is an exemplary embodiment for producing proprietary content from a QR code read in the form of extended care data.

FIG. 5 may show another exemplary embodiment 500 of, for example, proprietary content read in the form of extended care data that may be provided through a QR code 502 in connection with the proprietary mobile application described herein.

In this example, at a point of sale or post-purchase, a consumer may scan a QR code 502 using the proprietary mobile application to access guidelines 504 on how best to care for the product or item in order to maximize its life and minimize its environmental impact. A written explanation of care symbols could be included, as could hints, tips, and/or techniques on repairs and repair centers. Data could be pulled from generic external sources (e.g. Ginetex Clevercare) as well as item-specific databases, as would be understood by a person of ordinary skill in the art. The data in this model could be hosted, for example, on a variety of external or internal systems 506 and compiled by a portal associated with the mobile application into a 'dashboard' for presentation on a display to the consumer.

Figure 6:
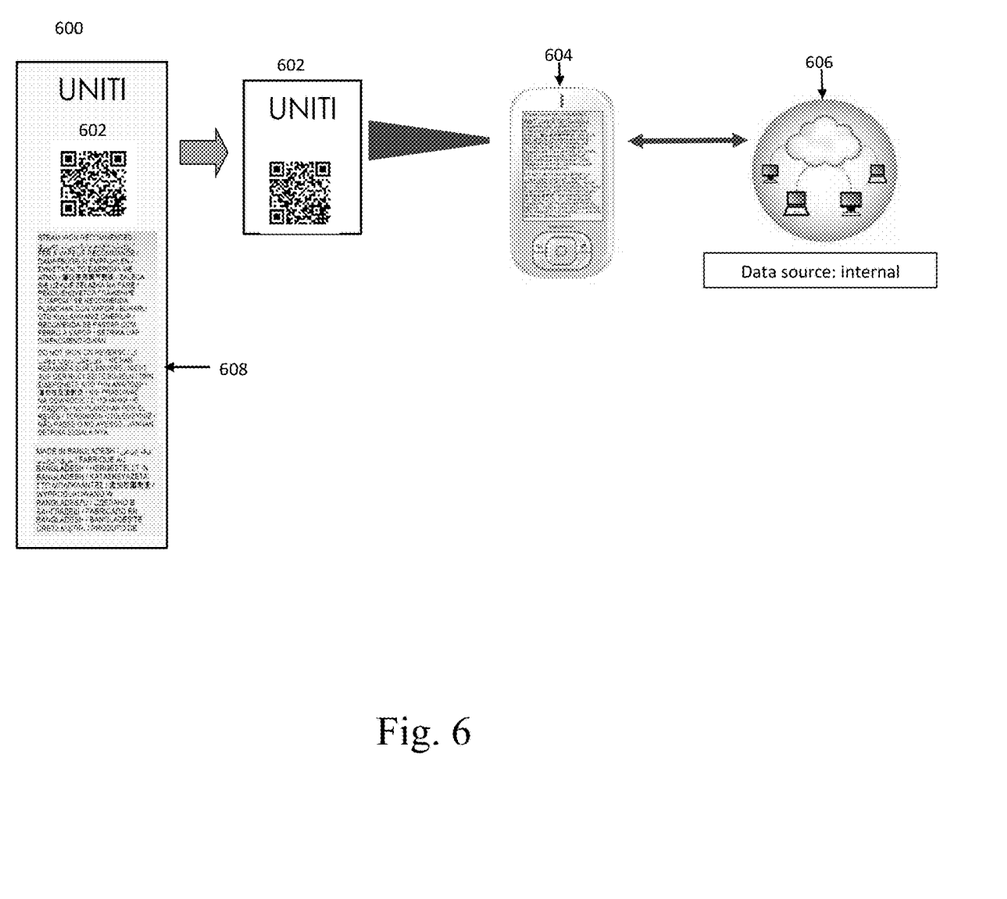
FIG. 6 is an exemplary embodiment for producing proprietary content from a QR code read in the form of care and content information data; and Exemplary

FIG. 6 may show another exemplary embodiment 600 of, for example, proprietary content read in the form of care and content information data that may be provided through a QR 602 code in connection with the proprietary mobile application described herein.

In this example, during post-purchase, a consumer may scan the QR code 602 to access care and content information as originally printed in full on the care label. This may allow the consumer to cut or tear away a substantial portion 608 of the care label where this information is printed, generally in multiple languages. The result may be enhanced comfort of a much smaller label without sacrificing access to care and content information. The data in this model could be hosted, for example, on an internal system 606 and compiled by a portal associated with the mobile application and displayed either in its totality or by a user-selectable language.

Figure 7:
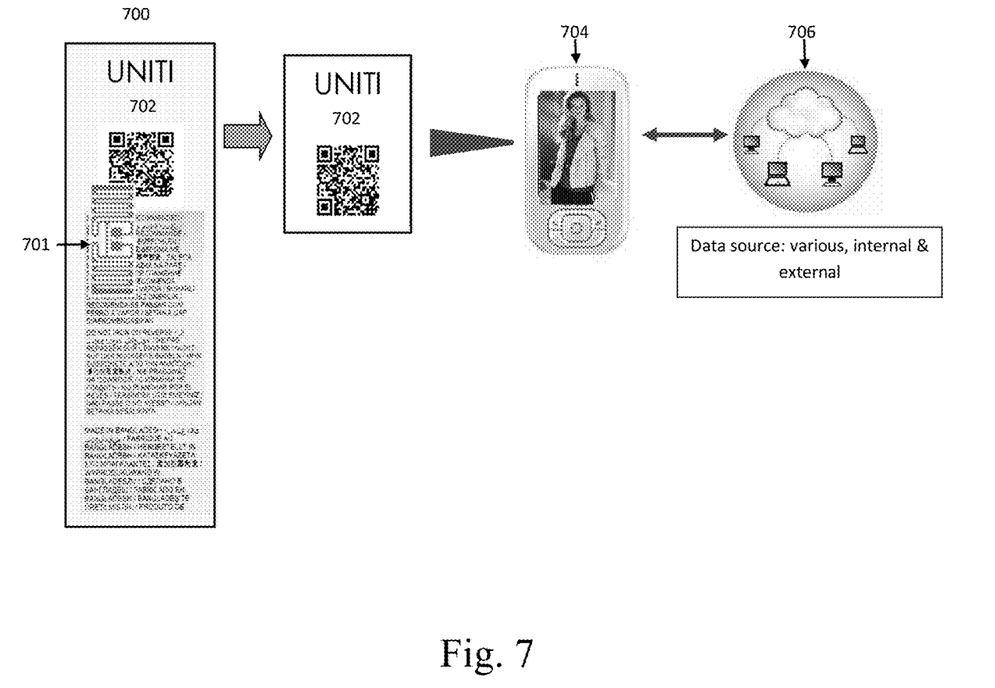
FIG. 7 is an exemplary embodiment of a multi-layered QR code including an RFID inlay.

FIG. 7 may show an exemplary embodiment 700 of an RFID inlay 701 associated with exemplary embodiments described herein. An RFID inlay 701 may be incorporated into a care label and encoded with a unique EPC number. The EPC number can be reproduced wholly or in part in a QR code 702 which may be printed on the same label.

A smartphone 704 running a suitable or desired application may decode the EPC from the QR code 702, eliminating the need for a dedicated RFID reader. This may present many more opportunities to capture the EPC and reference associated databases at points in the supply chain where RFID readers are not installed.

Further, the consumer may remove the portion of the label including the inlay (for example to increase comfort or privacy) but retain the ability to access any data sources 706 linked to the EPC.

Referring generally to FIGS. 1-7, the exemplary embodiments described herein may be utilized with any item or product having a QR code. For example, for apparel and footwear, the exemplary embodiments described herein can be utilized to display both general content from a QR code, as well as proprietary content such as, but not limited to, composition, care instructions, chain of custody, sustainability, or the like. As would be understood by a person of ordinary skill in the art, the type of proprietary information read from the mobile application may be tailored to a type of product or item having the QR code, or modified depending on the product or item.

In further exemplary embodiments, a QR code may hold a unique identification number which may connect, for example, to a secure database via an application and data link to trace, authenticate, or the like. For example, a QR may encode a URL connecting to content as described herein, as well as a unique serial number, or the like, which may be separated from the URL by, for example, a control character.

The unique serial number may reference a secure database and may hold item-specific data regarding the production and distribution of the article, or other information as would be understood by a person of ordinary skill in the art. A consumer-facing application may use the QR code to access non-sensitive information, and a brand inspector application could scan the same QR but may isolate the unique number to look up the specific item in the secure database.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for displaying proprietary information with a multi-layered quick response code, comprising:
    scanning at least one quick response code affixed to an item or product using a scanner device; the at least one quick response code correlating a URL to a unique serial number where the unique serial number can be separated from the URL by a control character and the unique serial number references a secure database and holds item specific data;
    reading first information embedded within the quick response code through one or more mobile applications running on the scanner device;
    linking the scanner device to content hosted on or accessed via a web portal associated with the one or more mobile applications and compiling data from the portal for a dashboard;
    displaying second information about the item or product from a plurality of data sources, wherein at least a portion of the second information about the item or product includes the proprietary information unique to a provider of the one or more mobile applications; and
    one of the one or more mobile applications assigns a code to one or more merchants or retailers.

2. The method of claim 1, wherein at least one of the data sources is from a source other than a retailer of the item or product.

3. The method of claim 1, wherein the content includes at least one of sustainability data, toxicity data, product safety data, and supply chain information.

4. The method of claim 1, wherein the scanner device is at least one of a smartphone, tablet or mobile device equipped with at least one of a camera or reader.

5. The method of claim 1, wherein the quick response code is a multi-layered quick response code.

6. The method of claim 5, wherein a first layer of the multi-layered quick response code includes information unique to a retailer of the product or item which is accessible through a first generic mobile application, and at least one second layer of the multi-layered quick response code includes proprietary information which is not accessible through the first generic mobile application.

7. The method of claim 6, wherein the proprietary information is accessible through a second proprietary mobile application from a source other than the retailer.

8. The method of claim 1, further comprising:
    associating at least one radio frequency identification inlay with the at least one quick response code.

9. A system for displaying proprietary information with a multi-layered quick response code, comprising:
    at least one quick response code having at least one unique identification number affixed to an item or product; the at least one quick response code correlating a URL to a unique serial number where the unique serial number can be separated from the URL by a control character, and further where the unique serial number references a secure database and holds item-specific data regarding the production and distribution of the item or product;
    at least one scanner device configured to read the at least one quick response code;
    a first mobile application running on the scanner device and configured to read a first layer of the at least one quick response code and display a first content on a display of the scanner device based on first information embedded in the first layer;
    at least one second mobile application running on the scanner device and configured to read at least one second layer of the at least one quick response code and display at least one second content on the display of the scanner device based on second information embedded in the at least one second layer, wherein at least a portion of the first and/or second information embedded in the at least one quick response code about the item or product includes proprietary information unique to a provider of the first mobile application or the at least one second mobile application and the proprietary content includes at least one of sustainability data, toxicity data, product safety data, material content, and product care data; and at least one of the first mobile application or the at least one second mobile application decodes an electronic product code (EPC) from the at least one quick response code.

10. The system of claim 9, wherein the at least one second content is not accessible through the first mobile application.

11. The system of claim 9, wherein the at least one second content is provided from a source other than a retailer of the item or product.

12. The system of claim 9, wherein the at least one second content includes proprietary information unique to a provider of the at least one second mobile application.

13. The method of claim 9, wherein the scanner device is at least one of a smartphone, tablet or mobile device equipped with at least one of a camera or reader.

14. The system of claim 9, further comprising:
    at least one radio frequency identification inlay associated with the at least one quick response code.

* * * * *